United States Patent Office 3,124,420
Patented Mar. 10, 1964

3,124,420

MANUFACTURE OF PYROPHOSPHORYL CHLORIDE

Rudolf G. Grautigam, New Brunswick, N.J., assignor to The American Agricultural Chemical Company, New York, N.Y., a corporation of Delaware No Drawing. Filed Dec. 5, 1960, Ser. No. 73,539
10 Claims. (Cl. 23—203)

This invention relates to pyrophosphoryl chloride. More particularly, this invention relates to a method for manufacturing pyrophosphoryl chloride. Still more particularly, this invention relates to an improved method of manufacturing pyrophosphoryl chloride wherein the reactants employed comprise the elements oxygen, phosphorus and chlorine.

It is an object of this invention to provide a simple, convenient and direct process for the manufacture of pyrophosphoryl chloride employing as reactants, elemental oxygen, elemental chlorine and elemental phosphorus.

Another object of this invention is to provide a process for the manufacture of pyrophosphoryl chloride wherein phosphorus oxychloride is produced as a valuable by-product.

How these and other objects of this invention are obtained will become apparent in the light of the accompanying disclosure.

It has now been discovered that pyrophosphoryl chloride is obtained by reacting an admixture comprising elemental oxygen, elemental chlorine and elemental phosphorus. More particularly in accordance with this invention pyrophosphoryl chloride is prepared by reacting yellow phosphorus dissolved in a suitable inert liquid solvent with gaseous oxygen and gaseous chlorine.

In accordance with a specific embodiment, pyrophosphoryl chloride is manufactured by contacting a solution of yellow phosphorus in a suitable inert solvent, such as a halogenated or halocarbon, e.g. halogenated aromatic hydrocarbons or carbon tetrachloride, respectively, with gaseous oxygen and gaseous chlorine at a temperature in the range 65–150° C., more or less, to form a reaction mixture comprising pyrophosphoryl chloride and recovering pyrophosphoryl chloride as product by distillation.

In the preparation of pyrophosphoryl chloride the contacting operation, wherein gaseous oxygen and gaseous chlorine contact or react with a suspension or solution of yellow phosphorus in a suitable inert solvent, is carried out in a multi-stage operation. Specifically, upon the formation of a solution or suspension of yellow phosphorus in an inert solvent, the resulting solution or suspension is subjected to a first stage contacting operation by direct contact with gaseous elemental oxygen. Thereupon, a second stage contacting operation is carried out wherein a gaseous mixture of chlorine and oxygen is employed. This second stage contacting operation is carried out until oxygen is no longer consumed during the second stage contacting operation and unreacted oxygen is recovered in the effluent therefrom. Directly subsequent thereto the third stage contacting operation is carried out desirably involving substantially only gaseous chlorine. This third stage contacting operation employing gaseous chlorine is carried out until the chlorination reaction is substantially completed and the desired amount of pyrophosphoryl chloride has been produced in the resulting reaction mixture. The resulting reaction mixture is then processed, such as by frictional distillation, to recover the pyrophosphoryl chloride therefrom as product.

In the manufacture of pyrophosphoryl chloride in accordance with this invention the total amount of chlorine employed in the contacting operation, particularly in the second and third stage contacting operations, is equivalent to an amount less than three atoms of chlorine per atom of phosphorus in the reaction mixture and the total amount of oxygen employed in the contacting operations, particularly in the first and second stage contacting operations, is equivalent to an amount greater than one atom of oxygen per atom of phosphorus in the reaction mixture. Further, the amount of oxygen employed in the first stage contacting operation comprises only a minor amount of the total oxygen employed or consumed in the overall contacting operations, usually an amount of oxygen in the range 8–20% by weight, frequently in the range 10–15% by weight, of the total oxygen requirements in the overall process. Also, the amount of chlorine employed in the second stage contacting operation comprises only a minor amount of the total overall chlorine requirements of the subject process, such as an amount of chlorine in the range 8–20% by weight, usually an amount in the range 10–15% by weight, of the total chlorine requirements of the process. Further, in the second stage contacting operation wherein a gaseous mixture containing oxygen and chlorine is employed, any suitable mixture thereof is useful, desirably, a gaseous mixture of chlorine and oxygen having a molar ratio of chlorine to oxygen, respectively, of about four to about three.

The aforesaid contacting operations are desirably carried out at substantially atmospheric pressure and at a temperature in the range 65–150° C., more or less, preferably as low as possible commensurate with satisfactory reaction rates. Lower reaction temperatures slow down the reaction rates of the reactants, such as oxygen, for the formation of the pyrophosphoryl chloride product but, on the other hand, higher reaction temperatures, such as a temperature above about 150° C., lead to decomposition of the resulting formed pyrophosphoryl chloride with resulting diminution in product yield.

The contacting operations may be carried out over a range of temperatures or isothermally. Desirably, the contacting operations are carried out under reflux conditions with respect to the solvent employed. Further, the contacting operations may be carried out in three separate zones within a unitary contacting apparatus, either concurrently or countercurrently, so that the practice of this invention can be carried out in a substantially continuous operation. If desired, three separate contacting chambers or apparatus may be employed in a continuous manner or a single contacting chamber or apparatus may be employed in an intermittent or batch type operation, first introducing gaseous oxygen, followed by the introduction of a gaseous mixture of chlorine and oxygen and finally the introduction of gaseous chlorine. The advantages of the aforesaid contacting techniques can readily be realized in the practice of this invention.

Any suitable solvent may be employed to dissolve the phosphorus, yellow phosphorus, or to form a suspension thereof prior to contacting the same with the gaseous reactants. Suitable solvents include the halogenated hydrocarbons, such as the halogenated aromatic hydrocarbons, e.g. chlorinated naphthalenes, chlorinated benzenes, chlorinated alkyl-substituted benzenes, chlorinated diphenyls and the halo-carbons, particularly carbon tetrachloride and other halo-carbons such as the chloro-carbons (i.e. molecules containing only chlorine and carbon atoms) containing from 1 to 3 carbon atoms per molecule.

In accordance with one feature of this invention phosphorus oxychloride is a suitable solvent in the practice of this invention. Further, the reaction product itself, an admixture of phosphorus oxychloride and pyrophosphoryl chloride, is useful as a solvent in the practice of this invention.

The following examples are illustrative of the practice of this invention.

*Example No. 1*

Three grams (0.09 mol) of oxygen were reacted with 34 grams (1.1 mols) of yellow phosphorus suspended in 797 grams (5.2 mols) of carbon tetrachloride at a temperature in the range 75–80° C. Subsequently, a gaseous mixture containing 80 grams (1.12 mols) of chlorine and 19 grams (0.6 mol) of oxygen was introduced into the resulting reaction mixture until the reaction mixture was saturated with respect to oxygen. The chlorination operation (introduction of gaseous chlorine) was then continued until the resulting reaction mixture was a clear solution.

Following the aforesaid operations the reaction mixture was refluxed for about 1.5 hours under agitation and then distilled into three fractions, a carbon tetrachloride fraction (780 grams) recovered at a temperature in the range 33–35° C. and at a pressure of 150 mm. Hg absolute, a phosphorus oxychloride fraction (114 grams) recovered at a temperature of 40–45° C. and at a pressure of 100 mm. Hg absolute and a product pyrophosphoryl chloride fraction (29.2 grams) recovered at a temperature of 85–90° C. and at a pressure of 1 mm. Hg absolute. There was separately recovered, following the aforesaid distillation operations, a residue weighing 2.5 grams. In the aforesaid operations 66% of the feed elemental phosphorus reacted to form phosphorus oxychloride and 21% of the feed elemental phosphorus reacted to form pyrophosphoryl chloride, giving a total phosphorus utilization of 87%. In this example the following total amounts of reactants were employed, 797 grams carbon tetrachloride, 34 grams yellow phosphorus, 31.5 grams oxygen and 111 grams chlorine.

*Example No. 2*

Fifteen grams (0.47 mol) of oxygen were reacted with 166 grams (5.35 mols) of yellow phosphorus suspended in 1072 grams (7.0 mols) of phosphorus oxychloride as solvent at a temperature in the range 80–98° C. Directly subsequent a gaseous mixture containing 104 grams (3.24 mols) of oxygen and 312 grams (4.4 mols) of chlorine was employed to contact the resulting reaction mixture for a period of from 2–3 hours. Following the contacting operation gaseous chlorine in an amount 108 grams (1.52 mols) was introduced into contact with the reaction mixture.

During the aforesaid contacting operations the reaction mixture was vigorously stirred while the temperature of the reaction mixture was maintained in the range 80–98° C. Following the introduction of the gaseous chlorine the resulting reaction mixture was subjected to vacuum distillation and fractionated into two fractions, a phosphorus oxychloride fraction amounting to 1641 grams recovered at a temperature in the range 40–45° C. and at a pressure of 100 mm. Hg absolute and a pyrophosphoryl chloride fraction amounting to 134 grams recovered at a temperature in the range 77–82° C. and at a pressure of about 1 mm. Hg absolute. Based on 100% phosphorus oxychloride recovery, the phosphorus utilization with respect to the production of phosphorus oxychloride as a valuable by-product amounted to 67% and the phosphorus utilization with respect to the manufacture of the desired product, pyrophosphoryl chloride amounted to 20%, with a total phosphorus utilization of 89%. In this example the following total amounts of reactants were employed, 1072 grams phosphorus oxychloride, 420 grams chlorine and 119 grams oxygen.

As will be apparent to those skilled in the art in the light of the foregoing disclosure many modifications, changes and alterations are possible in the practice of this invention without departing from the spirit or scope thereof.

I claim:

1. A method of preparing pyrophosphoryl chloride which comprises, in a first contacting operation contacting a solution of yellow phosphorus in an inert solvent with a gas consisting essentially of gaseous oxygen, thereupon in a second contacting operation contacting said solution with a gaseous mixture consisting essentially of chlorine and oxygen until said solution is substantially saturated with oxygen, in a third contacting operation contacting said solution with a gas consisting essentially of gaseous chlorine until the resulting chlorination reaction is substantially completed and fractionating the resulting reaction mixture to separate pyrophosphoryl chloride therefrom as product, the total amount of chlorine consumed in the aforesaid contacting operations being less than three atoms of chlorine per atom of phosphorus, the total amount of oxygen consumed in the aforesaid contacting operation being greater than one atom of oxygen per atom of phosphorus, the amount of oxygen consumed in said first contacting operation being in the range 8–20% by weight of said total amount of oxygen consumed and the amount of chlorine consumed in said second contacting operation being in the range 8–20% by weight of said total amount of chlorine consumed, the aforesaid contacting operations being carried out at a temperature in the range 65–150° C. and at substantially atmospheric pressure.

2. A method in accordance with claim 1 wherein said solvent is carbon tetrachloride.

3. A method in accordance with claim 1 wherein said solvent is phosphorus oxychloride.

4. A method in accordance with claim 1 wherein said solvent is phosphorus oxychloride recovered from said reaction mixture.

5. A method in accordance with claim 1 wherein the ratio of chlorine to oxygen in said gaseous mixture is in the range about 1–2 mols chlorine per mol of oxygen.

6. A method in accordance with claim 1 wherein said contacting operations are carried out under solvent reflux conditions.

7. A method in accordance with claim 1 wherein said solvent is a chlorinated aromatic hydrocarbon.

8. A method in accordance with claim 1 wherein the third contacting operation is carried out until the resulting reaction mixture is clear.

9. A method in accordance with claim 1 wherein said solvent is a mixture of phosphorus oxychloride and pyrophosphoryl chloride.

10. A method of preparing pyrophosphoryl chloride which comprises, in a first contacting operation contacting a solution of yellow phosphorus in an inert solvent with a gas consisting essentially of gaseous oxygen, thereupon in a second contacting operation contacting said solution with a gaseous mixture consisting essentially of chlorine and oxygen until said solution is substantially saturated with oxygen, in a third contacting operation contacting said solution with a gas consisting essentially of gaseous chlorine until the resulting chlorination reaction is substantially completed and fractionating the resulting reaction mixture to separate pyrophosphoryl chloride therefrom as product, the total amount of chlorine consumed in the aforesaid contacting operations being less than 3 atoms of chlorine per atom of phosphorus, the total amount of oxygen consumed in the aforesaid contacting operations being greater than 1 atom of oxygen per atom of phosphorus, the amount of oxygen consumed in said first contacting operation being a minor amount of said total amount of oxygen consumed and the amount of chlorine consumed in said second contacting operation being a minor amount of said total amount of chlorine consumed, the aforesaid contacting operations being carried out at a temperature in the range 65–150° C. and at substantially atmospheric pressure.

References Cited in the file of this patent

Chemical Abstracts, 1956, col. 544(d) (Japanese Patent 5,517), 1954, Sept. 2, 1954.

Chemical Abstracts, 1959, col. 2554(h) (Japanese Patent 5,527), 1958, July 26, 1958.

Chemical Abstracts, 1957, col. 14462(g), Viscounti et al., "New Method of Making Pyrophosphoryl," Anorg. Chem. Intern. Union Reine u Angew Chem. Munster, 1954, 232–5 (pub. 1955).